UNITED STATES PATENT OFFICE.

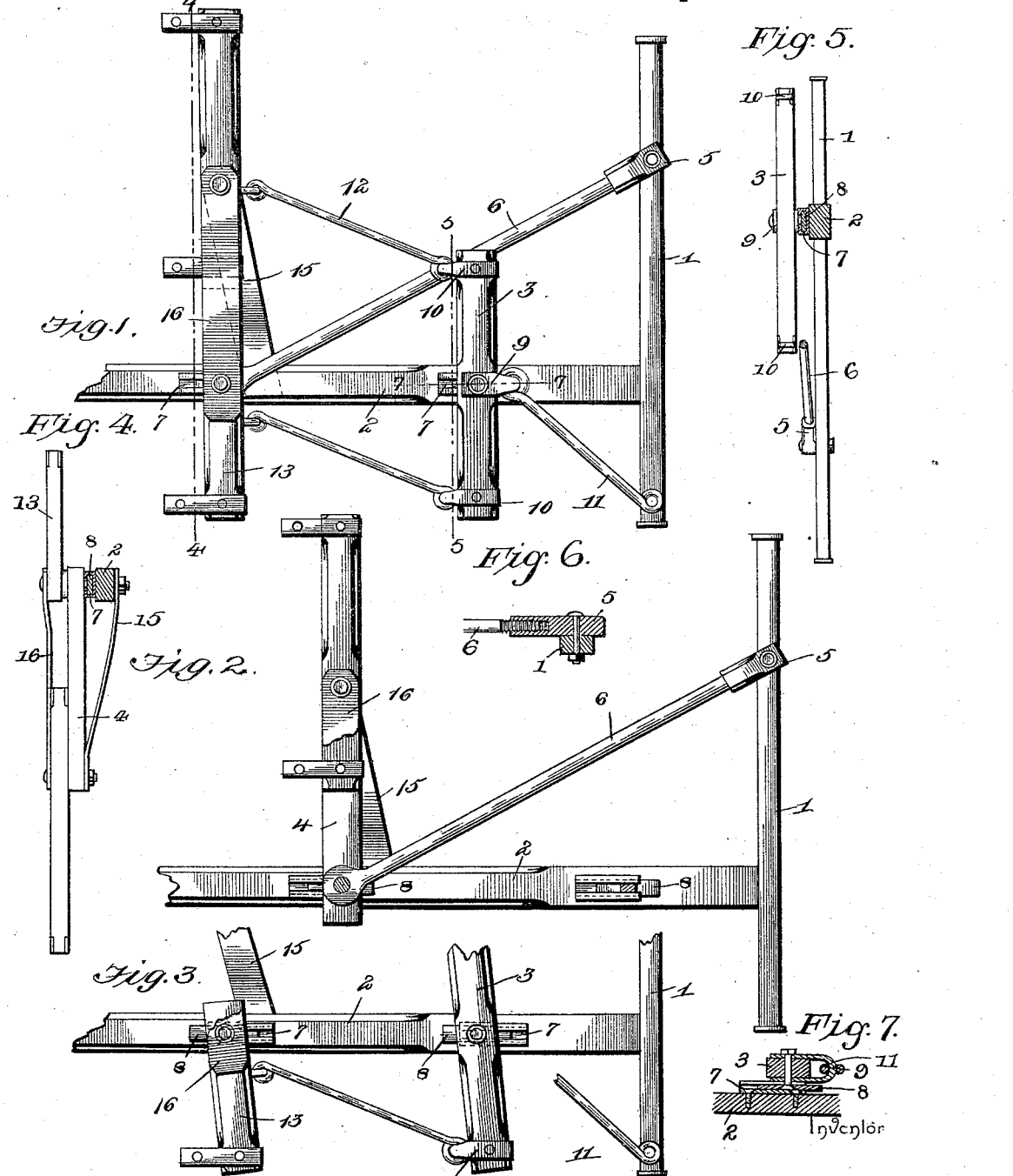

JOHN T. HALVERSON, OF LAKE JOHANNA, MINNESOTA.

DRAFT-EQUALIZER.

SPECIFICATION forming part of Letters Patent No. 537,530, dated April 16, 1895.

Application filed July 14, 1894. Serial No. 517,541. (No model.)

*To all whom it may concern:*

Be it known that I, JOHN T. HALVERSON, a citizen of the United States, residing at Lake Johanna, in the county of Polk and State of Minnesota, have invented a new and useful Draft-Equalizer, of which the following is a specification.

The invention relates to draft equalizers for use on reaping machines, wagons and other vehicles.

It consists of a pole, trees, eveners, connecting rods, and clips, and an adjustable rod or bar for connecting the trees and eveners, the object being to equalize the draft, and to avoid side draft. These objects are attained by the peculiar construction and arrangement of parts hereinafter described, and illustrated in the accompanying drawings, which form a part of this specification, and in which—

Figure 1 is a top plan view of my invention. Fig. 2 is a like view, with the rear evener bar and the singletree removed, showing the structure of the adjustable rod or bar, and its connection with the front evener bar and the draft bar or axle. Fig. 3 is a detail showing the manner of connecting the evener bars with the tongue or pole. Fig. 4 is a sectional view on line 4—4 of Fig. 1. Fig. 5 is a similar view on line 5—5 of Fig. 1. Fig. 6 is a detail sectional view of the tap block. Fig. 7 is a detail sectional view on line 7—7 of Fig. 1.

Similar numerals of reference indicate corresponding parts in the different views of the drawings.

1 is the draft bar or axle of the binder or vehicle, and 2 is the tongue or pole. These two parts are of any usual or preferred construction, but the pole or tongue is secured to one side of the center of the draft bar or axle. Mounted centrally on the tongue or pole, in a manner to be adjustable in the direction of the length thereof, as will be hereinafter explained, is the evener bar 3, and arranged near the front end of the tongue or pole in the same manner, but wholly on the right side thereof, looking from the rear, is a second evener bar 4. These two bars are practically of the same length.

For the purpose of clearness in the further description of the equalizer, the longer side will be defined as the right side, and the shorter as the left side, that is, looking from the rear.

On the extreme right of the draft bar or axle 1, is secured in any desired way, a tap block or bracket 5, to receive the threaded end of a long bar 6, which is bolted or otherwise secured on the front evener bar 4, just above the pole or tongue 2. The rod 6 may be lengthened or shortened by means of the screw thread on the end thereof. On the upper side or top of the tongue or pole are secured two grooved or flanged slide plates or ways 7, 7, one near the front, and the other near the rear end of the tongue or pole. These plates 7 may be made of cast or wrought iron, and provide for the adjustment of the evener bars 3 and 4 carrying single and doubletrees, in the direction of the length of the pole or tongue.

On the under side of the rear evener bar 3 is a tongue or plate 8 near its longitudinal center, and on the front evener bar on its under side at its left end, is a like tongue or plate 8 well shown in Fig. 3 of the drawings. These tongues are adapted to rest in the grooved slide plate 7, and are movable therein as before described, for the longitudinal adjustment of the two evener bars, with the single and doubletree.

At the rear side of the evener bar 3, near its center, and pivoted thereto, is a clip or clevis 9, and on the front of said bar at each of its ends is a like clip 10.

The short rod 11 is connected to the left side of the bar or axle at one end, and pivoted or swiveled to the clip or clevis 9 on the evener bar at the other end.

A long bar or rod 12 is secured to the front evener bar near its right end, and extends rearwardly, and is pivoted or swiveled to the clip 10 on the right end of the evener bar 3, and a somewhat shorter rod is pivoted or swiveled at one end to the clip or clevis 10 at the left end of the evener bar 3, and also near the center of the singletree 13, which is pivoted at its right end to the front end of the long draft rod 6, and the left end of the front evener bar 4.

A doubletree is pivoted to the right end of the evener bar 4, which, when the draft is direct, is in alignment with said bar and the singletree 13.

A suitable curved brace or bracket 15 extends from the inner side of the evener 4 to the under side of the tongue, for supporting and strengthening the parts.

An arched brace or bracket 16 also connects the singletree and doubletree, and is arranged to adjust itself with said trees to any changed line of draft.

It will be readily apparent that the evener bars and the singletree and doubletree with their connections are movable together in the sliding or bearing plates arranged on the top of the pole or tongue, and that the long rod or bar 6 may be easily adjusted, and will push back the binder or vehicle, and in connection with the eveners will avoid all side draft.

The invention is simple and inexpensive in construction, and extremely practicable as a draft equalizer.

Changes in the form, proportion, and the minor details of construction may be made without departing from the principle, or sacrificing any of the advantages of my invention.

What I claim is—

1. The combination in a draft equalizer, of a pole provided with front and rear ways, the front and rear evener bars disposed transversely of the pole and slidingly and pivotally mounted in said ways, whiffletrees mounted on the front evener bar, a rod connecting one end of the rear evener bar to the front evener bar, a rod extending from the other end of the rear evener bar to the adjacent whiffletree, a draft bar, and connections between the draft bar and the evener bars, substantially as described.

2. In a draft equalizer, the combination of a draft bar, a pole provided with front and rear ways, the front and rear evener bars disposed transversely of the pole and slidingly and pivotally mounted in said ways, and capable of forward and rearward movement on the pole, the front evener bar having one end arranged over the pole and the rear evener bar being centrally mounted thereon, an adjustable bar extending from the draft bar to the inner end of the front evener bar, a rod extending from the draft bar to the center of the rear evener bar, whiffletrees mounted on the front evener bar, and connections between the rear evener bar and the front evener bar and whiffletrees, substantially as described.

3. In a draft equalizer, the combination of a draft bar, a pole provided with front and rear ways, the front and rear evener bars provided at their lower faces with pivoted plates slidingly arranged in said ways, the front evener bar having its plate arranged at one end of it, and the rear evener bar having its plate centrally arranged on it, an adjustable bar extending from the draft bar to the inner end of the front evener bar, the rod 11 extending from the draft bar to the center of the rear evener bar, the rod 12 extending from one end of the rear evener bar to the front evener bar, a singletree connected with the other end of the rear evener bar and mounted on the inner end of the front evener bar, a doubletree mounted on the other end of the front evener bar, and an arched brace connecting the singletree and doubletree, substantially as described.

In testimony that I claim the foregoing as my own I have hereto affixed my signature in the presence of two witnesses.

JOHN T. HALVERSON.

Witnesses:
ANDREW T. HALVERSON,
GILBERT GAKSTAD.